Patented July 31, 1951

2,562,850

UNITED STATES PATENT OFFICE 2,562,850

PROCESS FOR PREPARING A FOOD PRODUCT FROM BACON RIND OR PORK SKIN

James C. Winslow, Los Angeles, Calif., assignor to George A. Darrow, Glendale, Calif.

No Drawing. Application December 13, 1947, Serial No. 791,670

11 Claims. (Cl. 99—107)

The present invention relates to a process for preparing a food product from bacon rind or pork skin, and its principal object is to provide a method whereby a deliciously flavored food product that is crisp and tender, nutritious, and readily digestible, may be prepared from bacon rind or other parts of pork skin. The finished product is in the form of thin chips of about $1/32$ inch thickness, which are preferably, although not necessarily, cut into rectangular shapes measuring approximately ½ inch in width by 2 inches in length. These chips are crisp and friable, substantially free from oil or fat, and have a delicate bacon flavor.

Another object of the invention is to provide a process for producing a food product of the class described which utilizes bacon rinds or pork skins of all sizes and shapes, including relatively small particles which are usually discarded as scrap. This is a big advantage over prior processes for producing somewhat similar food products, which require relatively large bacon rinds measuring in the neighborhood of nine by twenty-four inches, since a substantial proportion of the total bacon rind and pork skin that is available is considerably smaller in size than the dimensions given, and therefore is not suitable for use. With the present process, the size of the bacon rinds or pork skins is of no consequence, and the entire available output can be utilized.

Still a further object of the invention is to provide a process for preparing a food product from bacon rinds and pork skins, which produces a consistently uniform product free from the tough, inedible culls which are unavoidably prevalent in prior processes for treating bacon rinds.

Another object of the invention is to provide a process of the class described which is particularly well adapted to large scale production methods, and which can be carried on in equipment requiring the minimum of attention by human operators.

These and other objects of the invention will become apparent to those skilled in the art during consideration of the following description of the preferred process, it being understood that various changes may be made in the sequence of steps, and in the time and temperature conditions specified hereinafter, without departing from the scope of the invention, as set forth in the appended claims.

In carrying out the invention, the first step in the process is to reduce the bacon rinds or pork skins to a substantially gelatinous condition, which is accomplished by cooking the rinds or skins under temperature and pressure conditions causing the conversion to take place. This is preferably done in a steam pressure cooker at a gage pressure of from 30 to 40 pounds, and a temperature of approximately 275° F. to 287° F. A cooking time of about 30 minutes is usually sufficient to effect a substantially complete conversion of the rind and skin to the gelatinous condition, although the time may be increased or decreased somewhat without deleterious effect. The rinds may be cooked whole, or they may be ground or chopped first to small particles. The preferred method is to cook the rinds whole, as the uncooked rinds are quite tough and difficult to grind. During the cooking operation, a considerable amount of fat associated with the rind or skin is cooked out, producing a high grade lard which is removed as a by-product.

The next step in the process is to remove the bulk of the remaining fat in the gelatinized rind or skin, which may be accomplished in a press or other separator. The preferred method of separating out this remaining fat, however, is by passing the rinds or skins through an auger-type grinder while the material is still hot from the pressure cooking operation. The grinder, in this case, functions more or less like an extrusion press, breaking the rinds or skins up into fine particles, and discharging the same as a heavy, sticky amorphous mass which flows like a viscous semi-solid. In order to facilitate separation of the liquid fat from the gelatinous material, the auger chamber of the grinder is vented at the low pressure end thereof, and the liquid fat which is pressed out of the semi-solid material drains out through the vent and is recovered as a lard by-product of somewhat lower quality than the lard recovered from the pressure cooking operation. The knives that are customarily used in the auger grinder are not actually required in this grinding operation, but are helpful if the rind has not been completely reduced to a gelatinous state. Either an auger-type extrusion machine or corrugated rolls might be substituted for the grinder in this operation, although the auger-type grinder has been found to be most satisfactory for the purpose.

The gelatinous mass is now formed into sheets or rectangular strips of thickness determined by the desired width of the finished chips. These sheets or strips can be formed by running the plastic material between a series of rolls, or by passing it through an extrusion machine. The sheets or strips are preferably, although not necessarily, of about ⅜ inch to ⅝ inch thickness, and may be formed as a single sheet which is subsequently slit into strips of from one and one-half to three inches in width, or it may be extruded through dies of the desired dimensions.

The gelatinous material is now cooled until it becomes quite firm, which takes place when the temperature reaches about 70° to 80° F. If the material at this stage is in sheet form, the sheet is now divided or slit into strips of from one and one-half to three inches in width. The cooled and now firm strips of gelatinous material are then run through a slicer which slices them into thin chips, preferably about 1/64 inch in thickness, and not more than 1/32 inch thickness. If the chips are cut any thicker than 1/32 inch, they have an undesirable tendency to form a tough core in the subsequent cooking operation. On the other hand, chips which are only about 1/64 inch thick always result in a well crisped product of uniform excellency.

The next step in the process is to cook the chips quickly and at high temperature so as to cause them to puff up and become crisp. This is best accomplished by frying the chips in hot fat or vegetable oil, the latter being preferred, at a temperature of 350° to 400° F. The cooking time is approximately one minute, and during this time the cells puff up or expand somewhat so that the chips are about double their original thickness. During the cooking operation, the chips may either be held submerged under the surface of the hot fat, or allowed to rise to the surface as they begin frying. Instead of frying in deep fat, the chips might be baked in a moderate-to-hot oven for about five minutes, or they might be cooked by radiant roasting. However, the deep fat frying is believed to produce a superior product and is the preferred method of cooking the chips.

Following the frying operation, the chips are lifted out of the hot fat, and the excess fat is allowed to drain off. The draining of the cooking fat may be hastened by shaking the chips, if desired, but such shaking operation is usually not required. The chips can now be packaged, if desired, although I have found that it is advantageous to bake them in a moderate oven for a short period of time to aid in eliminating any grease remaining from the frying operation. The chips will be adequately dried if baked at a temperature of about 350° F. for about 2 minutes, although a slightly longer time may be used if desired. The process is now completed, and the chips are ready for consumption or for packaging. If necessary, flavoring can be added at any stage in the process to enhance the natural bacon flavor of the rind. The preferred flavoring materials are liquid smoked extracts and salt, although any other seasoning might be used if desired.

An alternative method of practicing the invention is to reduce the bacon rinds or pork skins to a gelatinous condition in a pressure cooker, as described hereinbefore, removing substantially all of the grease by either pressing, grinding, or very prolonged cooking, and then rolling the gelatinous material into very thin sheets of approximately 1/64 inch to 1/32 inch thickness. This sheet is subsequently chilled, cut into chips of the desired size, and then fried in hot fat or vegetable oil, as described earlier, either with or without the subsequent baking operation.

Another alternative method of practicing the invention is to roll the gelatinized material into thin sheets of 1/64 inch to 1/32 inch thickness, and then after chilling the sheets, fry the uncut sheets in hot fat. After the sheet has been cooked, it might be broken into particles of a size suitable for packaging. It is also contemplated that the chilling step might be omitted, in which case the thin sheets or chips would pass directly into the hot fat while still in a semi-solid state. This method is not considered as desirable as the others, however, since the chips or sheets have a tendency to contract and become relatively thick when they hit the hot grease. This thickening effect causes the chips to develop tough cores, which is undesirable.

Still another method of practicing the invention is to cook the whole rind to the gelatinous state, and then after removal of all grease, place the rinds one on top of another and press them together tightly, causing them to adhere and form one gelatinous mass. The rinds can then be chilled and sliced into thin chips or strips which are subsequently fried and then baked, or merely fried and packaged.

Various other deviations in the process coming within the scope of the invention will occur to those skilled in the art. The fundamental principle of the invention lies in the reduction of the bacon rinds or pork skins to a gelatinous or semi-gelatinous mass from which substantially all of the grease is removed, after which the material is formed into very thin chips of about 1/32 to 1/64 inch thickness, which are cooked briefly at high temperature to cause them to puff up and become crisp.

I claim:

1. The process of producing a food product from bacon rind, comprising the steps of cooking the rind until the same has been reduced substantially to a gelatinous mass, separating the grease from the gelatinous mass, forming said gelatinous mass into thin chips, and then cooking said chips at a relatively high temperature of the order of 350° to 400° F. until the chips become crisp and slightly puffed.

2. The process of producing a food product from bacon rind, comprising the steps of cooking the rind until the same has been reduced substantially to a gelatinous mass, separating the grease from the gelatinous mass, forming said gelatinous mass into thin chips, frying said chips in hot fat until the chips become crisp, and then baking said chips in a moderate oven for a short time to remove excess fat remaining from the frying operation.

3. The process of producing a food product from bacon rind, comprising the steps of cooking the rind until the same has been converted substantially to a gelatinous condition, grinding said gelatinized rind into an amorphous mass, forming said gelatinous mass into thin chips, and frying said chips in hot fat until the chips become crisp.

4. The process of producing a food product from bacon rind, comprising the steps of cooking the rind until the same has been converted substantially to a gelatinous condition, reducing said gelatinized rind to an amorphous mass, forming said gelatinous mass into thin chips, frying said chips in hot fat until the chips become crisp, and then baking said chips in a moderate oven for a short time to remove excess fat remaining from the frying operation.

5. The process of producing a food product from bacon rind, comprising the steps of cooking the rind until the same has been converted substantially to a gelatinous condition, reducing said gelatinized rind to an amorphous mass, forming said gelatinous mass into thin chips, frying said chips for approximately one minute in hot fat at a temperature of 350°–400° F., and then baking said chips for approximately two minutes in an oven temperature of about 350° F.

6. The process of producing a food product from bacon rind, comprising the steps of cooking the rind until the same has been converted substantially to a gelatinous condition, grinding said gelatinized rind into an amorphous mass, forming said gelatinous mass into a flat sheet, cooling said sheet to cause said gelatinous mass to become firm, cutting said sheet into relatively thin chips, and frying said chips in hot fat until the chips become crisp.

7. The process of producing a food product from bacon rind, comprising the steps of cooking the rind until the same has been converted substantially to a gelatinous condition, grinding said gelatinized rind into an amorphous mass, forming said gelatinous mass into a flat sheet of approximately one-half inch thickness, cooling said sheet to cause said gelatinous mass to become firm, dividing said sheet into strips approximately two inches wide, slicing each of said strips to form chips of about $1/64$ to $1/32$ inch thickness, and then frying said chips in hot fat until the chips become crisp.

8. The process of producing a food product from bacon rind, comprising the steps of cooking the rind until the same has been converted substantially to a gelatinous condition, grinding said gelatinized rind into an amorphous mass, forming said gelatinous mass into a flat sheet, cooling said sheet to cause said gelatinous mass to become firm, cutting said sheet into relatively thin chips, frying said chips for approximately one minute in hot fat at a temperature of 350°–400° F., and then baking said chips for approximately two minutes in an oven temperature of about 350° F.

9. The process of producing a food product from bacon rind, comprising the steps of cooking the rind until the same has been reduced substantially to a gelatinous mass, separating the grease from the gelatinous mass, cooling said gelatinous mass until it has become firm, forming said cooled gelatinous mass into thin chips of about $1/32$ to $1/64$ inch thickness, and then cooking said chips rapidly at a relatively high temperature in the neighborhood of 400° F. until the chips become slightly puffed up and crisp.

10. The process of producing a food product from bacon rind, comprising the steps of cooking the rind until the same has been reduced substantially to a gelatinous mass, separating the grease from the gelatinous mass, cooling said gelatinous mass until it has become firm, forming said cooled gelatinous mass into thin chips of about $1/32$ to $1/64$ inch thickness, frying said chips for approximately one minute in hot fat at a temperature of 350°–400° F., and then baking said chips in a moderate oven to remove excess fat remaining from the frying operation.

11. The process of producing a food product from bacon rind, comprising the steps of cooking the rind until the same has been reduced substantially to a gelatinous mass, separating the grease from the gelatinous mass, forming said gelatinous mass into thin chips while still hot, cooling said chips until they become firm, frying said chips in hot fat until they become slightly puffed up and crisp, and then baking said chips for about two minutes in a moderate oven to remove excess fat remaining from the frying operation.

JAMES C. WINSLOW.

REFERENCES CITED

The following references are of record in the file of this patent:

UNITED STATES PATENTS

| Number | Name | Date |
| --- | --- | --- |
| 2,179,616 | Darrow | Nov. 14, 1939 |